Jan. 25, 1927. 1,615,575

J. T. DOWSE

WOODWORKING MACHINE

Filed Nov. 26, 1923

Inventor
John T. Dowse

Patented Jan. 25, 1927.

1,615,575

UNITED STATES PATENT OFFICE.

JOHN T. DOWSE, OF TORONTO, ONTARIO, CANADA.

WOODWORKING MACHINE.

Application filed November 26, 1923. Serial No. 677,038.

The principal objects of the invention are to produce a portable wood-working machine which will be capable of performing a wide variety of work and is particularly adapted for temporary installation in a building under construction and may be furnished at a very moderate cost.

The principal features of the invention consist in supporting a slidable cutter-carriage upon a guideway arranged above an adjustable table top and in providing an arrangement of a belt and pulleys which will maintain a constant drive to the cutter pulleys throughout the length of travel of the carriage.

A further feature of the invention consists in the novel arrangement of a supplemental table on the cutter table with a sliding holder for mitreing and cross cutting.

In the drawings, Figure 1 is a perspective view of the machine.

Figure 1:
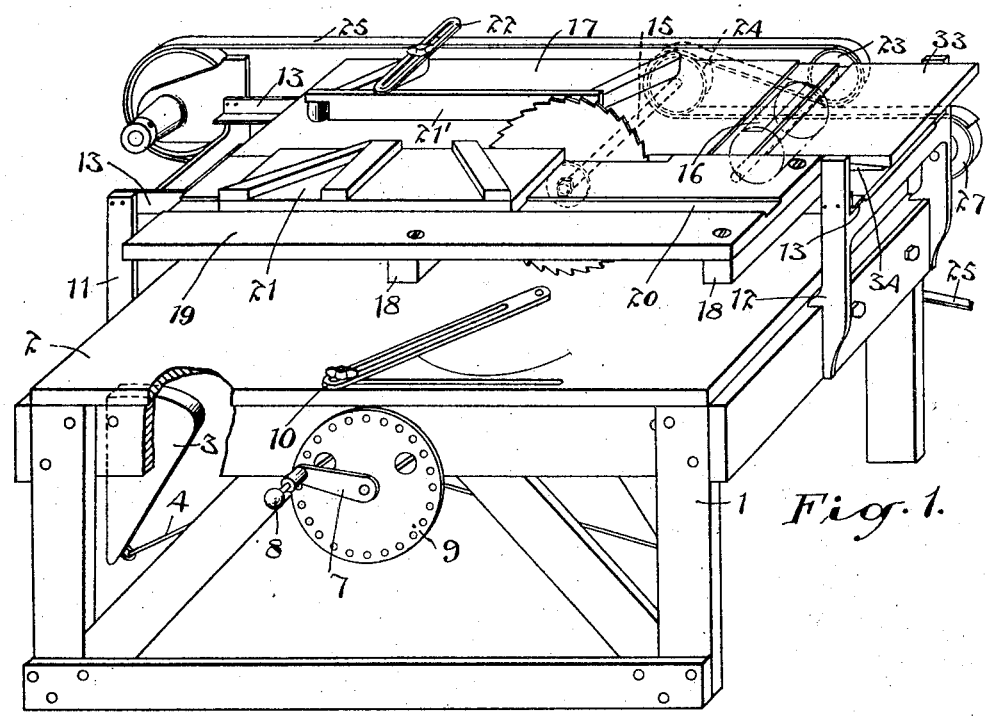
Figure 2:
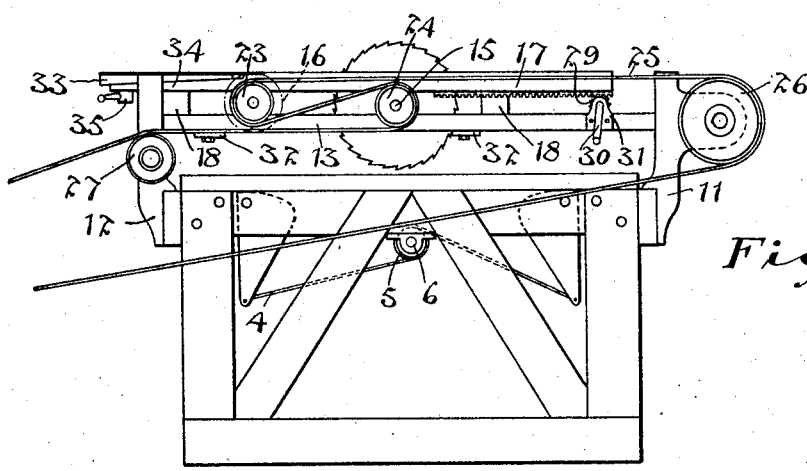
Figure 2 is an elevation of the back of the machine.
Figure 3:
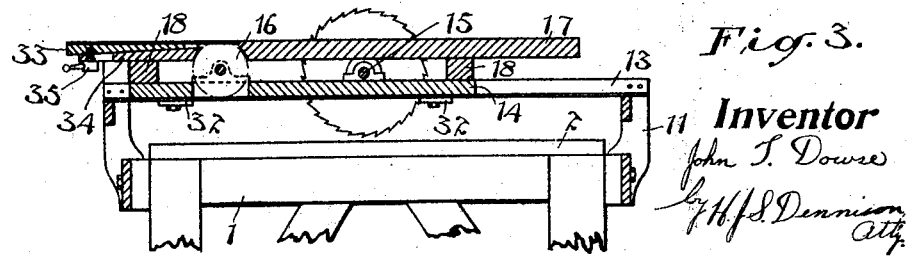
Figure 3 is a longitudinal section taken through the carriage and supporting brackets.

In the form of the invention illustrated, the supporting frame 1 is of any suitable rigid construction and supports a top 2 which is vertically adjustable by means of cam members 3 pivotally supported on the frame at each of the corners. The cams are operated by cables 4 wound upon drums 5 arranged on the shaft 6 journalled in the frame and the shaft is operated by a crank 7 which is held in adjusted positions by the sliding pin 8 engaging a dial plate 9. In this way a very accurate adjustment of the table top may be obtained.

A slotted guide arm 10 is pivoted at one end to the table top and may be clamped at any desirable angular relation to the saw, so that a piece of wood laid on the table may be cut at any desirable angle.

Rigid brackets 11 and 12 are secured to the frame 1 at opposite ends and in alignment with each other. Angle guide members 13 are rigidly secured to and extend parallelly between the brackets to form the guideway for the sliding saw carrage 14. The saw shaft 15 and planer head 16 are mounted in suitable journals on the carriage 14.

A cutting table 17 is supported upon the carriage 14, being spaced therefrom by the cross members 18. An extension table 19 is removably supported on the members 18 at the front side of the table 17 and is provided with a guide slot 20 for the mitre box 21 which is operated by hand thereon at one side of the saw.

Mounted on the cutting table 17 is an adjustable guide 21' which is used in ripping and may be locked in any desired position by means of the slotted arm 22. It will be noted that the driving pulley 23 of the head 16 is mounted higher on the carriage 14 than is the driving pulley 24 of the saw and the driving belt 25 is passed under the saw pulley and then loops around the planer pulley and clears the top of the belt looped around the saw pulley. The belt is carried to one end of the machine and loops around an idler pulley 26 mounted on the bracket 11 from whence it extends to a suitable power device such as an engine or motor. A supporting idler 27 is arranged on the bracket 12.

In the utilization of this machine for ripping, the mitre box 21 is removed and the guide 21' is set over from the saw the proper distance, and the board to be ripped is fed to the saw by hand, the operator sliding it along the top of the tables 17 or 19 which remain stationary. Longitudinal movement of the carriage in the guideway is limited by the cross member 18 coming in contact with the projecting legs of the bracket 12. Mitreing s accomplished by sliding the mitre box past the saw, along the extension table 19 in the guide slot provided, it being possible to make two cuts for matching with the one operation. Small squaring cuts can also be done by the use of the same mitre box.

When it is necessary to do any heavy cross cutting the work is placed on the lower table and the carriage operated past the work. For the purpose of mortising, the lower table is also used, the work being elevated by the table top to the point where the desired depth of cut is obtained.

The work of mortising a stringer for a stairway has usually entailed a considerable expenditure of time on the part of the workman. This condition is very undesirable, particularly in view of the fact that this class of work must be executed very accurately in order that the risers and treads should form perfect joints with the stringer.

Any work of this nature may be done very accurately and with a considerable saving in time with the machine described.

The work is laid flat on the table which is then adjusted to give the desired depth of the cut. The guide arm 10 is then adjusted in order that the proper angle may be cut, the work being held firmly against it while the saw is passed over the work. In order that the carriage may be steadily moved on its guide members, the underside of the cutting table is provided with a rack 28. This rack is engaged by a pinion 29 carried on the crank 30, the boss 31 being rigidly secured to the outer side of the guide member 13.

Holding members 32 are secured to the under side of the carriage for the purpose of slidingly engaging the lower side of the guide members 13 to prevent any undue chatter of the carriage when the machine is in operation and to impart a definite resistance to the longitudinal movement of the carriage in order to prevent it from moving during the planing operation.

The top of the planer head 26 is on the same level as the top of the cutting platform. The surface of a portion of the platform is here shown depressed below the general surface, to a distance that will determine the thickness of the cut that the planer head will take off. The upper part of this depressed portion is preferably composed of a separate plate 33 having its lower surface sloped at an angle corresponding to that of the upper surface of the portion 34 of the cutting table 17 so that the thickness of the cut can be closely regulated by sliding the plate to or away from the planer head and locking by means of the clamp 35.

Heretofore, in a machine of this class, the design was such that in order to change from one operation to another it was nearly always necessary to make certain changes in the machine, which involved a great waste of valuable time. The machine here described however was devised with a view to overcoming this objectionable feature and to further increase the scope of such a device. Being driven from an outside source, any available form of power may be utilized.

What I claim as my invention is:—

1. A woodworking machine having a vertically adjustable horizontal table, a rigid guideway extending longitudinally of and spaced above said table, a saw carriage slidably mounted on said guideway, a saw extending above and below the carriage having its shaft journalled transversely of said carriage, and means arranged at the side of the carriage remote from the saw for operating said saw.

2. A woodworking machine comprising a rigid frame, a saw mounted on said frame, a table arranged at one side of said saw, an extension table arranged at the other side of said saw, said extension table having a longitudinal guide and a mitre box slidably arranged on said guide and adapted to move past said saw.

JOHN T. DOWSE.